Nov. 17, 1959   D. H. FULLER   2,912,858
PROPORTIONAL PHOTO-ELECTRIC FLOW MEASUREMENT SYSTEM
Filed July 10, 1958
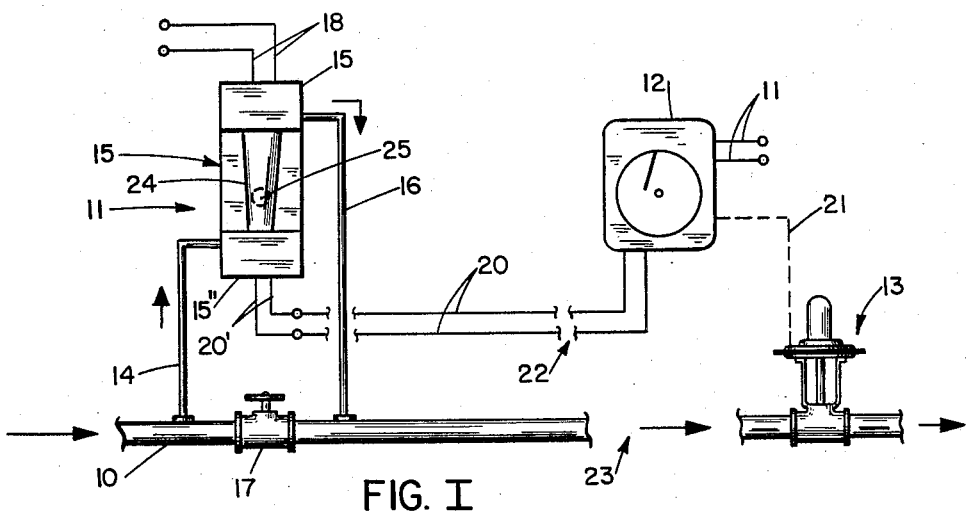
FIG. I
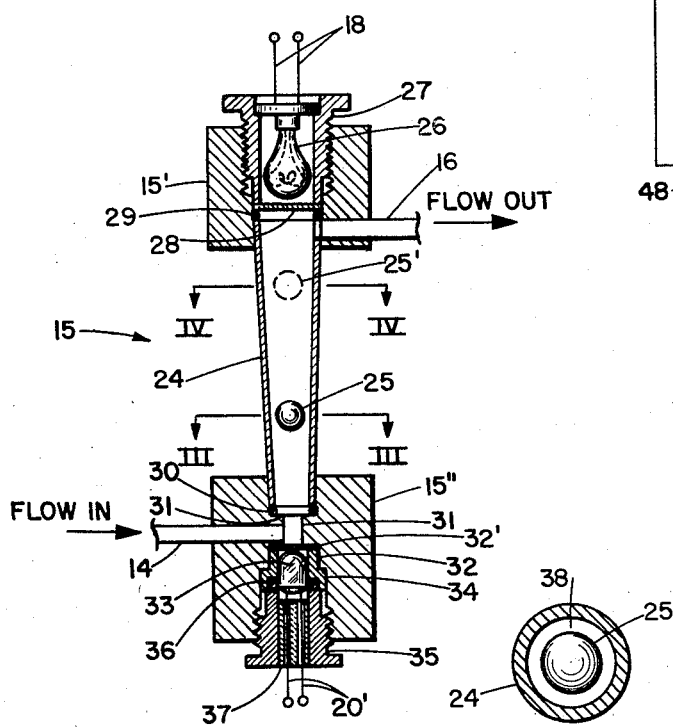
FIG. II
FIG. III
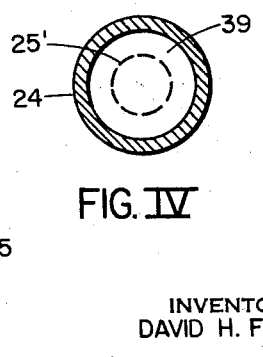
FIG. IV
FIG. V
INVENTOR
DAVID H. FULLER
BY
Lawrence H. Paston
AGENT United States Patent Office 2,912,858
Patented Nov. 17, 1959

2,912,858

PROPORTIONAL PHOTO-ELECTRIC FLOW MEASUREMENT SYSTEM

David H. Fuller, Wrentham, Mass., assignor to The Foxboro Company, Foxboro, Mass., a corporation of Massachusetts Application July 10, 1958, Serial No. 747,678

2 Claims. (Cl. 73—209)

This invention relates to continuous, proportional measurement of fluid flow, and has particular reference to such measurement by means of a light source and photo-electric cell combination.

The system of this invention is concerned with either liquid or gas flow and is particularly useful in low flow situations, i.e., small volume per unit time.

Prior art low flow measurements have been made, as indicators only, by means of a vertically disposed, transparent flow tube with a ball or other body of rotation therein, movable in the tube according to upward flow through the tube. The flow rate is visually indicated by the vertical location of the body in the tube, with respect to a vertically disposed set of markings on the tube.

The system of this invention provides low flow measurement capable of indication, recording, or control, on a continuous, proportional basis.

Further, in many modern situations, it is desirable to measure low fluid flows at distant points. The prior art devices, having no working outputs, are not suitable since they are usable only when an operator is at the measuring location. The system of this invention provides means for measuring low flows at a distance. This invention further provides the advantage of an effectively linear output, from the flow sensing device, which is available as a working force.

It is, accordingly, an object of this invention to provide a new and improved flow measurement system.

Other objects and advantages of this invention will be in part apparent and in part pointed out hereinafter.

In the drawings:

Figure I is a schematic illustration of a flow measurement system according to this invention;

Figure II is a detail of a part of Figure I, in vertical, central cross-section, showing a flow tube-photo cell combination according to this invention;

Figure III is a cross-section enlargement of the structure of Figure II, taken as on line III—III, as if Figure II were unsectioned, with a light interceptor ball flow-supported at one vertical location, and indicating one flow condition;

Figure IV is a cross-section enlargement of the structure of Figure II, taken as on line IV—IV, as if Figure II were unsectioned, with the ball a dotted line indication of the light interceptor flow-supported at another vertical location, and indicating another flow condition; and Figure V is an alternate structure according to this invention and illustrating the use of a reference system to cancel out light transmission changes in the fluid being measured, for example as due to color changes in the fluid.

Referring to Figure I, the system shown therein and embodying this invention comprises a fluid flow pipe 10, a flow sensing arrangement 11 mounted on the flow pipe 10, a flow recording and control instrument 12, operable by the output of the flow sensing arrangement 11, and a flow control valve 13, mounted in the flow pipe 10 downstream of the flow sensing arrangement 11 and operable by the output of the flow control instrument 12.

The flow sensing arrangement 11 includes a flow take-off pipe 14, mounted in the pipe 10, a photo-cell assembly 15 to and through which fluid flow is directed by means of the flow take-off pipe 14, and a flow return pipe 16 from the photo-cell assembly 15, to the flow pipe 10, at a point downstream of the take-off pipe 14.

In the flow pipe 10 and between the take-off pipe 14 and the return pipe 16, a valve 17 is provided as a means of setting up a sufficient restriction to produce a continuous fluid flow through the by-pass comprising the take-off pipe 14, the photo-cell assembly 15, and the return pipe 16.

Electrical leads 18 and 19 are provided to energize the light source of the photo-cell assembly 15 and to energize the recorder 12, respectively. The output of the photo-cell assembly 15 is electrical, and is directed to the recorder 12 through electrical leads 20. The valve 13 may be pneumatically operated, and a suitable operating connection therefore is indicated by the dotted line 21. Through the use of suitable amplification means (not shown), the flow sensing arrangement 11 may be located a substantial distance away from the recorder 12, and a break 22 is shown in the electrical leads 20 as an indication of such an arrangement. The flow pipe 10 is also broken as at 23 to indicate that the valve 13 may also be distant from the flow sensing arrangement 11, if desired.

The Figure I showing of the photo-cell assembly 15 generally illustrates a vertically disposed flow tube 24. A light interceptor ball 25 is supported therein by fluid flow upwards through the flow tube 24 from the take-off pipe 14 to the return pipe 16, as illustrated in Figure II. The tube 24 is tapered upwardly and outwardly in the form of a truncated cone. The ball 25 is shown by way of illustration. Other forms of bodies of rotation are similarly suitable for use in the system of this invention.

The Figure II showing is a detailed enlargement of the photo-cell assembly 15 of Figure I, with part of the supporting structure omitted.

At the top of Figure II a suitable light source 26 is mounted in a threaded sleeve jacket 27. The jacket 27 is threaded into a top portion 15' of the photo-cell assembly 15. A protective transparent glass plate 28 is placed over the lower end of the jacket 27 and light rays from the source 26 pass therethrough into the top, large end of the vertical flow tube 24. The flow tube 24 extends up into the top portion 15' of the assembly, and a resilient O ring 29 acts as a seal and buffer between the protective plate 28 and the top of the flow tube 24. The flow return pipe 16 takes off from the top portion of the flow tube 24 and laterally through the top portion 15' of the photo-cell assembly.

The flow tube 24 is opaque so that no ambient light can enter, and none of the light rays from the source 26 can escape through the wall of the tube. Thus the light rays from the source 26 travel down through the tube 24, some directly and some reflecting back and forth across the tube in a downward travelling action. The light interceptor ball 25 blocks off different amounts of the total light passing through the tube 24, depending on the vertical location of the ball, as will be discussed hereinafter.

The bottom end of the flow tube 24 extends into a bottom portion 15'' of the photo-cell assembly 15, and rests on an O ring 30 which in turn rests on a shoulder 31. A passage 31 is provided from the lower end of the flow tube 24 down to a photo-cell unit 32. The take-off pipe 14 provides a fluid in-flow to the passage 31 between the bottom of the flow tube 24 and the photo-cell unit 32. The photo-cell unit 32 is mounted in the bottom portion 15" of the photo-cell overall assembly 15. A protective transparent plate 32' is mounted over the photo-cell unit 32. The photo-cell unit consists of a photo-cell 33, a top sleeve 34 and a bottom sleeve 35 separated by an O ring 36, the whole being held in fluid sealing condition by a thread arrangement on the bottom sleeve 35. A plug 37 is mounted in the bottom sleeve 35 with output electrical leads 20' extending therethrough in sealed relation therewith from the photo-cell 33.

Accordingly, as in Figure II, the light interceptor ball 25 is supported at a vertical location in the flow tube 24 which is determined by the flow therethrough. Other determinants are the weight and size of the ball, the nature of the flowing fluid, i.e., its density and viscosity, and the size and degree of taper in the flow tube 24 itself. These latter determinants are constant for any one situation 20 that the vertical location of the ball 25 is directly dependent on the flow rate of the fluid.

In Figure II, one flow rate is illustrated by the location of the ball 25 and another, greater, flow rate is illustrated by the location of the dotted line ball 25'. The greater flow rate supports the ball higher in the flow tube, and because of the upwardly increasing outward taper of the tube 24, more light rays get downwardly past the ball 25' than past the ball 25.

Figures III and IV respectively illustrate annular light passage areas 38 with respect to the ball at the 25 location and 39 with respect to the ball at the 25' location, the greater area being 39 since 25' is higher in the tube 24, thus indicating a greater fluid flow upwards through the tube 24.

The variaton of light ray volume as applied to the photo-cell 33 is linear with the increase in flow. The tube 24 is formed with a uniform conical taper and is opaque. The ball 25 is a body of rotation which uniformly intercepts light rays whatever its location in the tube 25 and the weight and size of which is constant. Thus the variants are the fluid flow, the light passage area around the ball, and the amount of light reaching the photo-cell 33. Thus the output of the photo-cell 33 is a proportional representation of the rate of fluid flow through the flow tube 24.

Figure V is an illustration of alternate structure according to this invention, wherein a reference system is used to cancel out light transmission changes, for example as due to color changes in the fluid.

In the Figure V showing, a photo-cell arrangement in essential duplication of the Figure II device is used. The Figure V system comprises a light source 40, a tapered, opaque flow tube 41 with a ball 42 supported therein by upward fluid flow therethrough, and a photo-cell unit 43. The details of this structure are shown in Figure II. Similarly, a fluid flow-in pipe 44 is provided. The fluid flow-out is through a second tube 45 which is suitably open to the light source 40 and to the flow system of the flow-in pipe 44 and the tube 41. A second photo-cell unit 46 is provided at the outer end of the second tube 45, and an out-flow pipe 47 therefrom completes the fluid flow system. The outputs of the photo-cell units 44 and 46 are suitably and conventionally referenced against each other in a recording instrument 48. Thus any light transmission changes in the flowing fluid are cancelled out by means of the reference arrangement and an output from the recorder 48 is a proportional representation of the rate of fluid flow through the system.

This invention therefore provides a new and improved fluid flow measurement system.

As many embodiments may be made of the above invention and as changes may be made in the embodiment set forth above without departing from the scope of the invention, it is to be understood that all matter hereinbefore set forth or shown in the accompanying drawings is to be interpreted as illustrative only and not in a limiting sense.

I claim:
1. In a continuous, proportional measurement device for low fluid flows, a fluid flow system, a light-tight assembly comprising a vertically disposed tube for carrying fluid upwards as a part of said fluid flow system, said tube having its inner surface formation generally in the form of an upwardly and outwardly tapered truncated cone which is opaque and inwardly light reflective, a light source at the top, large diameter end of said tube for transmitting light rays downward therethrough, a photo-cell at the bottom, small diameter end of said tube, for receiving said light rays, and a light interceptor member in the form of a body of rotation movable up and down in said tube according to fluid flow therethrough and in varying degree of interception of said light rays in accordance with the vertical location of said body in said tube to apply varying light volume to said photo-cell in continuous, proportional representation of said flow through said tube, to produce a continuous output from said photo-cell which is available as a working force.

2. In a continuous, proportional measurement device for low fluid flows, a fluid flow system, a light-tight assembly comprising a first, vertically disposed tube for carrying fluid upwards as a part of said fluid flow system, said tube having its inner surface formation generally in the form of an inverted, truncated cone which is opaque and inwardly light reflective, a light source at the top, large diameter end of said tube for transmitting light rays downward therethrough, a first photo-cell at the bottom, small diameter end of said tube, for receiving said light rays, a light interceptor member in the form of a body of rotation, movable up and down in said tube according to fluid flow therethrough and in varying degree of interception of said light rays in accordance with the vertical location of said body in said photo-cell in continuous, proportional representation of said flow through said tube, a second light-tight assembly as a referencing device to balance out light transmission change factors such as color, said second assembly comprising a second tube also open to said light source, at one end of said second tube, and a second photo-cell at the other end of said second tube, fluid flow passage connections from said first tube to and through said second tube as a part of said fluid flow system, and means for referencing the output of said first photo-cell against the output of said second photo-cell, to produce a continuous output which is available as a working force.

References Cited in the file of this patent

UNITED STATES PATENTS

| | | |
|---|---|---|
| 2,246,464 | Gerber | June 17, 1941 |
| 2,325,884 | Schorn | Aug. 3, 1943 |
| 2,503,091 | Brooke | Apr. 4, 1950 |
| 2,506,585 | Elliott | May 9, 1950 |
| 2,554,715 | Mellett | May 29, 1951 |
| 2,588,672 | Turvey | Mar. 11, 1952 |